United States Patent
Zhang et al.

(10) Patent No.: US 10,044,658 B2
(45) Date of Patent: Aug. 7, 2018

(54) GROUP MESSAGING METHOD, AND DEVICE

(71) Applicant: Huawei Technologies Co., Ltd., Shenzhen (CN)

(72) Inventors: Feng Zhang, Shenzhen (CN); Liang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 378 days.

(21) Appl. No.: 14/847,777

(22) Filed: Sep. 8, 2015

(65) Prior Publication Data

US 2015/0381541 A1    Dec. 31, 2015

Related U.S. Application Data

(63) Continuation of application No. PCT/CN2013/073832, filed on Apr. 7, 2013.

(51) Int. Cl.
| | |
|---|---|
| *G06F 15/16* | (2006.01) |
| *H04L 12/58* | (2006.01) |
| *H04L 12/18* | (2006.01) |
| *H04W 4/06* | (2009.01) |
| *H04W 4/12* | (2009.01) |

(52) U.S. Cl.
CPC .......... *H04L 51/16* (2013.01); *H04L 12/1877* (2013.01); *H04L 51/20* (2013.01); *H04L 51/26* (2013.01); *H04L 51/30* (2013.01); *H04L 51/38* (2013.01); *H04W 4/06* (2013.01); *H04W 4/12* (2013.01)

(58) Field of Classification Search
CPC ..... H04L 51/16; H04L 51/26; H04L 12/1877; H04L 51/38; H04L 51/20; H04L 51/30; H04W 4/12; H04W 4/06
See application file for complete search history.

(56) References Cited

U.S. PATENT DOCUMENTS

| | | | |
|---|---|---|---|
| 9,160,755 B2* | 10/2015 | Chasin | H04L 63/126 |
| 9,189,775 B2* | 11/2015 | DeLuca | G06Q 50/01 |
| 9,489,661 B2* | 11/2016 | Evans | G06Q 10/107 |
| 2007/0025290 A1 | 2/2007 | Afrashteh et al. | |
| 2007/0290787 A1 | 12/2007 | Fiatal et al. | |
| 2009/0182819 A1* | 7/2009 | Krantz | H04L 51/14 |
| | | | 709/206 |

(Continued)

FOREIGN PATENT DOCUMENTS

| | | |
|---|---|---|
| CN | 1889711 A | 1/2007 |
| CN | 101277468 A | 10/2008 |

(Continued)

*Primary Examiner* — Krisna Lim
(74) *Attorney, Agent, or Firm* — Slater Matsil, LLP

(57) ABSTRACT

A group messaging method and a device, which relate to the field of communications is described. The group messaging method is applied to a group-send management device and includes: acquiring an information parameter of an information scheduling device, generating a group-send policy according to the information parameter, and sending the group-send policy to a terminal device served by the information scheduling device. The terminal device performs group messaging according to the group-send policy. The group messaging method and the device provided in the embodiments of the present invention are used for group messaging.

14 Claims, 7 Drawing Sheets

(56) References Cited

U.S. PATENT DOCUMENTS

2010/0004008 A1* 1/2010 Abolrous .............. H04L 51/063
                                                               455/466
2012/0284330 A1    11/2012 Figueroa
2013/0064164 A1     3/2013 Kim et al.

FOREIGN PATENT DOCUMENTS

| CN | 101674534 A |  3/2010 |
| CN | 101917690 A | 12/2010 |
| CN | 102281212   | 12/2011 |

* cited by examiner

GROUP MESSAGING METHOD, AND DEVICE

This application is a continuation of International Application No. PCT/CN2013/073832, filed on Apr. 7, 2013, which is hereby incorporated by reference in its entirety.

TECHNICAL FIELD

The present invention relates to the field of communications, and in particular, to a group messaging method and a device.

BACKGROUND

Information communication has gradually become a major contact way of interpersonal communication in modern society. A message may include an SMS message, a multimedia message, an instant message (IM), and the like. Generally, a short message service and a multimedia message service provided by a telecom operator and an IM service that is provided by an Internet company and based on a terminal device, such as a computer or a mobile phone, provide a great convenience for our daily communication and contact. In a scenario of information communication, there exists a scenario in which a communication initiator proactively initiates point-to-multipoint group messaging, that is, a sender sends a message to multiple recipients at a same time, for example, a meeting notice reminder message sent by a meeting organizer to participants, a group-sent message of blessing to relatives and friends at festivals, or the like.

In the prior art, when a telecom operator provides a group messaging service, and a user submits, by using a terminal device, a group-send task of sending a message to multiple people, a message application client on the terminal device disassembles the group-send task into multiple messages according to multiple recipients, and then the multiple messages are submitted one by one to an information scheduling device of the operator in sequence according to a queue, where after a message is submitted to the information scheduling device and a response message is received, a next message is then submitted, until all messages are sent. In the process, a group messaging state on the terminal device stays in "sending" all the time.

However, because group messaging is point-to-multipoint communication, it is easily affected by multiple factors, such as resource allocation by the information scheduling device, a network condition, and the like. For example, in order to ensure reasonable allocation of system resources, a short message center allocates a message cache queue for each phone number for temporarily saving an SMS message that is submitted by a mobile phone corresponding to the number but has not been processed by the short message center. However, a quantity of SMS messages that can be cached in the queue is finite, and once the queue is filled up, a subsequent SMS message submitted from this number is rejected by the short message center. If a quantity of recipients of group messaging by a mobile phone at a time is relatively large, a cache queue of a number corresponding to the mobile phone is easily caused be filled up and overflowed on a short message center side of an operator, thereby leading to a submission failure. However, when a message fails to be submitted, the mobile phone still continues to submit an SMS message to the short message center, until the group-send task ends. Therefore, a success rate of group messaging is relatively low.

SUMMARY

Embodiments of the present invention provide a group messaging method and a device, which can increase a success rate of group messaging.

To achieve the foregoing objective, the embodiments of the present invention use the following technical solutions:

According to a first aspect, a group messaging method is provided, which is applied to a group-send management device, including acquiring an information parameter of an information scheduling device; generating a group-send policy according to the information parameter; and sending the group-send policy to a terminal device served by the information scheduling device, so that the terminal device performs group messaging according to the group-send policy.

With reference to the first aspect, in a first possible implementation manner, the information parameter includes: an average message-sending time, a message cache threshold, and busy/idle period distribution. The group-send policy includes: a sending interval, a quantity range, and a validity period of the policy. The generating a group-send policy according to the information parameter includes: generating the validity period of the policy according to the busy/idle period distribution; and generating a quantity range and a corresponding sending interval of each period in the validity period of the policy according to the average message-sending time, the message cache threshold, and the validity period of the policy. The sending interval and the quantity range of each period in the validity period of the policy are in a one-to-one correspondence.

With reference to the first possible implementation manner of the first aspect, in a second possible implementation manner, the sending interval of each period includes at least one first sending interval and at least one second sending interval. The first sending interval is less than or equal to the average message-sending time, and a minimum value of a first quantity range corresponding to the first sending interval is greater than or equal to the message cache threshold. The second sending interval is greater than the average message-sending time, and a maximum value of a second quantity range corresponding to the second sending interval is less than the message cache threshold.

With reference to the first aspect, or the first or second possible implementation manner, in a third possible implementation manner, after the sending the group-send policy to a terminal device served by the information scheduling device, the method further includes: receiving group-send execution data sent by each terminal device, where the group-send execution data includes a message-sending period, a region identifier of a sending party, and a sending success rate of a terminal; processing the message-sending period, the region identifier of a sending party, and the sending success rate of a terminal that are sent by each terminal device, to obtain a sending success rate of each group-send area in each message-sending period, where at least one information scheduling device is disposed in each group-send area; determining whether there is a group-send area, in each group-send area in each message-sending period, whose sending success rate is less than a first preset reference value. When a sending success rate of a first group-send area in a first message-sending period is less than the first preset reference value, the method includes adjusting a group-send policy, for a relevant period of the first message-sending period, of a terminal device served by an information scheduling device in the first group-send area.

With reference to the first aspect, or the first or second possible implementation manner, in a fourth possible implementation manner, after the sending the group-send policy to a terminal device served by the information scheduling device, the method further includes: receiving group-send execution data sent by each terminal device, where the group-send execution data includes a message-sending period, a region identifier of a sending party, a region identifier of a receiving party, and a sending success rate of a terminal; processing the message-sending period, the region identifier of a sending party, the region identifier of a receiving party, and the sending success rate of a terminal that are sent by each terminal device, to obtain a receiving success rate of each group-send area in each message-sending period, where at least one information scheduling device is disposed in each group-send area; determining whether there is a group-send area, in each group-send area in each message-sending period, whose receiving success rate is less than a second preset reference value. When a receiving success rate of a first group-send area in a first message-sending period is less than the second preset reference value, the method further includes adjusting a group-send policy, for a relevant period of the first message-sending period, of a terminal device served by an information scheduling device in the first group-send area.

With reference to the third or fourth possible implementation manner of the first aspect, in a fifth possible implementation manner, the adjusting a group-send policy, for a relevant period of the first message-sending period, of a terminal device served by an information scheduling device in the first group-send area includes shortening a quantity range of the first message-sending period, to obtain a quantity range of the relevant period of the first message-sending period; and/or extending a sending interval of the first message-sending period, to obtain a sending interval of the relevant period of the first message-sending period.

According to a second aspect, a group messaging method is provided, which is applied to a terminal device, including: receiving, in a first period, a group messaging task of sending a message to N recipients, where N is greater than or equal to 2, and N is a quantity of group-sent messages; and performing group messaging according to a group-send policy sent by a group-send management device, where the group-send policy is generated by the group-send management device according to an information parameter of an information scheduling device.

With reference to the second aspect, in a first possible implementation manner, the group-send policy includes: a sending interval, a quantity range, and a validity period of the policy, where a sending interval and a quantity range of each period in the validity period of the policy are in a one-to-one correspondence. The performing group messaging according to a group-send policy sent by a group-send management device includes: acquiring, from the group-send policy, a specific quantity range in which the quantity N of group-sent messages is located in the first period; acquiring a specific sending interval corresponding to the specific quantity range; and performing group messaging according to the specific sending interval.

With reference to the second aspect or the first possible implementation manner, in a second possible implementation manner, after the performing group messaging according to a group-send policy sent by a group-send management device, the method further includes: generating group-send execution data, where the group-send execution data includes a message-sending period, a region identifier of a sending party, and a sending success rate, or the group-send execution data includes a message-sending period, a region identifier of a sending party, a region identifier of a receiving party, and a sending success rate; and sending the group-send execution data to the group-send management device, so that the group-send management device adjusts the group-send policy according to the group-send execution data.

With reference to the second aspect, or the first or second possible implementation manner, in a third possible implementation manner, in the performing group messaging according to a group-send policy sent by a group-send management device, the method further includes: displaying group-send state information on a display interface, where the group-send state information includes: a total quantity of recipients, a quantity of messages sent, and/or a recipient of a message that is being sent.

With reference to the second aspect, or the first or second possible implementation manner, in a fourth possible implementation manner, after the performing group messaging according to a group-send policy sent by a group-send management device, the method further includes: displaying group-send result information on a display interface, where the group-send result information includes: a total quantity of recipients, a quantity of messages successfully sent, and/or a quantity of messages unsuccessfully sent.

According to a third aspect, a group-send management device is provided, including an acquiring unit, configured to acquire an information parameter of an information scheduling device. A generating unit is configured to generate a group-send policy according to the information parameter. A sending unit is configured to send the group-send policy to a terminal device served by the information scheduling device, so that the terminal device performs group messaging according to the group-send policy.

With reference to the third aspect, in a first possible implementation manner, the information parameter includes: an average message-sending time, a message cache threshold, and busy/idle period distribution. The group-send policy includes: a sending interval, a quantity range, and a validity period of the policy. The generating unit is specifically configured to generate the validity period of the policy according to the busy/idle period distribution, and generate a quantity range and a corresponding sending interval of each period in the validity period of the policy according to the average message-sending time, the message cache threshold, and the validity period of the policy. The sending interval and the quantity range of each period in the validity period of the policy are in a one-to-one correspondence.

With reference to the first possible implementation manner of the third aspect, in a second possible implementation manner, the sending interval of each period includes at least one first sending interval and at least one second sending interval. The first sending interval is less than or equal to the average message-sending time, and a minimum value of a first quantity range corresponding to the first sending interval is greater than or equal to the message cache threshold. The second sending interval is greater than the average message-sending time, and a maximum value of a second quantity range corresponding to the second sending interval is less than the message cache threshold.

With reference to the third aspect, or the first or second possible implementation manner, in a third possible implementation manner, the group-send management device further includes a receiving unit configured to receive, after the sending unit sends the group-send policy to the terminal device served by the information scheduling device, group-send execution data sent by each terminal device. The group-send execution data includes a message-sending period, a region identifier of a sending party, and a sending success rate of a terminal, or the group-send execution data includes a message-sending period, a region identifier of a sending party, a region identifier of a receiving party, and a sending success rate of a terminal. A processing unit is configured to process the message-sending period, the region identifier of a sending party, and the sending success rate of a terminal that are received by the receiving unit, to obtain a sending success rate of each group-send area in each message-sending period, or configured to process the message-sending period, the region identifier of a sending party, the region identifier of a receiving party, and the sending success rate of a terminal that are received by the receiving unit, to obtain a receiving success rate of each group-send area in each message-sending period, where at least one information scheduling device is disposed in each group-send area. A determining unit is configured to: determine whether there is a group-send area, in each group-send area in each message-sending period, whose sending success rate is less than a first preset reference value; or determine whether there is a group-send area, in each group-send area in each message-sending period, whose receiving success rate is less than a second preset reference value. An adjusting unit is configured to: when the determining unit learns that a sending success rate of a first group-send area in a first message-sending period is less than the first preset reference value, or when the determining unit learns that a receiving success rate of a first group-send area in a first message-sending period is less than the second preset reference value, adjust a group-send policy, for a relevant period of the first message-sending period, of a terminal device served by an information scheduling device in the first group-send area.

With reference to the third possible implementation manner of the third aspect, in a fourth possible implementation manner, when adjusting the group-send policy, for the relevant period of the first message-sending period, of the terminal device served by the information scheduling device in the first group-send area, the adjusting unit is specifically configured to: shorten a quantity range of the first message-sending period, to obtain a quantity range of the relevant period of the first message-sending period; and/or extend a sending interval of the first message-sending period, to obtain a sending interval of the relevant period of the first message-sending period.

According to a fourth aspect, a terminal device is provided, including: a receiving unit configured to receive, in a first period, a group messaging task of sending a message to N recipients, where N is greater than or equal to 2, and N is a quantity of group-sent messages; and a sending unit, configured to perform group messaging according to a group-send policy sent by a group-send management device, where the group-send policy is generated by the group-send management device according to an information parameter of an information scheduling device.

With reference to the fourth aspect, in a first possible implementation manner, the group-send policy includes: a sending interval, a quantity range, and a validity period of the policy, where a sending interval and a quantity range of each period in the validity period of the policy are in a one-to-one correspondence; and the sending unit is specifically configured to: acquire, from the group-send policy, a specific quantity range in which the quantity N of group-sent messages is located in the first period; acquire a specific sending interval corresponding to the specific quantity range; and perform group messaging according to the specific sending interval.

With reference to the fourth aspect or the first possible implementation manner, in a second possible implementation manner, the terminal device further includes: a generating unit, configured to generate group-send execution data after the sending unit performs group messaging according to the group-send policy sent by the group-send management device, where the group-send execution data includes a message-sending period, a region identifier of a sending party, and a sending success rate, or the group-send execution data includes a message-sending period, a region identifier of a sending party, a region identifier of a receiving party, and a sending success rate; and the sending unit is further configured to send the group-send execution data to the group-send management device, so that the group-send management device adjusts the group-send policy according to the group-send execution data.

With reference to the fourth aspect, or the first or second possible implementation manner, in a third possible implementation manner, the terminal device further includes a display unit configured to display group-send state information on a display interface when the sending unit performs group messaging according to the group-send policy sent by the group-send management device, or display group-send result information on a display interface after the sending unit performs group messaging according to the group-send policy sent by the group-send management device. The group-send state information includes: a total quantity of recipients, a quantity of messages sent, and/or a recipient of a message that is being sent. The group-send result information includes: a total quantity of recipients, a quantity of messages successfully sent, and/or a quantity of messages unsuccessfully sent.

According to a fifth aspect, a group messaging system is provided, including any group-send management device described above; and any terminal device described above.

According to a sixth aspect, a group-send management device is provided, including a processor, configured to acquire an information parameter of an information scheduling device. The processor is further configured to generate a group-send policy according to the information parameter. A transmitter is configured to send the group-send policy to a terminal device served by the information scheduling device, so that the terminal device performs group messaging according to the group-send policy.

With reference to the sixth aspect, in a first possible implementation manner, the information parameter includes: an average message-sending time, a message cache threshold, and busy/idle period distribution. The group-send policy includes: a sending interval, a quantity range, and a validity period of the policy. When generating a group-send policy according to the information parameter, the processor is specifically configured to: generate the validity period of the policy according to the busy/idle period distribution, and generate a quantity range and a corresponding sending interval of each period in the validity period of the policy according to the average message-sending time, the message cache threshold, and the validity period of the policy. The sending interval and the quantity range of each period in the validity period of the policy are in a one-to-one correspondence.

With reference to the first possible implementation manner of the sixth aspect, in a second possible implementation manner, the sending interval of each period includes at least one first sending interval and at least one second sending interval. The first sending interval is less than or equal to the average message-sending time, and a minimum value of a first quantity range corresponding to the first sending interval is greater than or equal to the message cache threshold. The second sending interval is greater than the average message-sending time, and a maximum value of a second quantity range corresponding to the second sending interval is less than the message cache threshold.

With reference to the sixth aspect, and the first or second possible implementation manner, in a third possible implementation manner, the group-send management device further includes a receiver configured to receive, after the transmitter sends the group-send policy to the terminal device served by the information scheduling device, group-send execution data sent by each terminal device. The group-send execution data includes a message-sending period, a region identifier of a sending party, and a sending success rate of a terminal, or the group-send execution data includes a message-sending period, a region identifier of a sending party, a region identifier of a receiving party, and a sending success rate of a terminal. The processor is further configured to process the message-sending period, the region identifier of a sending party, and the sending success rate of a terminal that are received by the receiver, to obtain a sending success rate of each group-send area in each message-sending period, or process the message-sending period, the region identifier of a sending party, the region identifier of a receiving party, and the sending success rate of a terminal that are received by the receiver, to obtain a receiving success rate of each group-send area in each message-sending period. At least one information scheduling device is disposed in each group-send area. The process is further configured to determine whether there is a group-send area, in each group-send area in each message-sending period, whose sending success rate is less than a first preset reference value; or determine whether there is a group-send area, in each group-send area in each message-sending period, whose receiving success rate is less than a second preset reference value. When a sending success rate of a first group-send area in a first message-sending period is less than the first preset reference value, or a receiving success rate of a first group-send area in a first message-sending period is less than the second preset reference value, adjust a group-send policy, for a relevant period of the first message-sending period, of a terminal device served by an information scheduling device in the first group-send area.

With reference to the third possible implementation manner of the sixth aspect, in a fourth possible implementation manner, when adjusting the group-send policy, for the relevant period of the first message-sending period, of the terminal device served by the information scheduling device in the first group-send area, the processor is specifically configured to: shorten a quantity range of the first message-sending period, to obtain a quantity range of the relevant period of the first message-sending period; and/or extend a sending interval of the first message-sending period, to obtain a sending interval of the relevant period of the first message-sending period.

According to a seventh aspect, a terminal device is provided, including: a receiver configured to receive, in a first period, a group messaging task of sending a message to N recipients, where N is greater than or equal to 2, and N is a quantity of group-sent messages. A transmitter is configured to perform group messaging. A processor is configured to instruct, according to a group-send policy sent by a group-send management device, the transmitter to perform group messaging, where the group-send policy is generated by the group-send management device according to an information parameter of an information scheduling device.

With reference to the seventh aspect, in a first possible implementation manner, the group-send policy includes: a sending interval, a quantity range, and a validity period of the policy, where a sending interval and a quantity range of each period in the validity period of the policy are in a one-to-one correspondence. The processor is specifically configured to acquire, from the group-send policy, a specific quantity range in which the quantity N of group-sent messages is located in the first period; acquire a specific sending interval corresponding to the specific quantity range; and instruct the transmitter to perform group messaging according to the specific sending interval.

With reference to the seventh aspect or the first possible implementation manner, in a second possible implementation manner, the processor is further configured to generate group-send execution data after the transmitter performs group messaging, where the group-send execution data includes a message-sending period, a region identifier of a sending party, and a sending success rate, or the group-send execution data includes a message-sending period, a region identifier of a sending party, a region identifier of a receiving party, and a sending success rate; and send the group-send execution data to the group-send management device by using the transmitter, so that the group-send management device adjusts the group-send policy according to the group-send execution data.

With reference to the seventh aspect, and the first or second possible implementation manner, in a third possible implementation manner, the terminal device further includes: a display, configured to display group-send state information on a display interface when the transmitter performs group messaging, or display group-send result information on a display interface after the transmitter performs group messaging. The group-send state information includes: a total quantity of recipients, a quantity of messages sent, and/or a recipient of a message that is being sent. The group-send result information includes: a total quantity of recipients, a quantity of messages successfully sent, and/or a quantity of messages unsuccessfully sent.

According to an eighth aspect, a group messaging system is provided, including any group-send management device described above; and any terminal device described above.

The embodiments of the present invention provide a group messaging method and a device. A group-send management device is added to a group messaging system, so that a terminal device may perform group messaging according to a group-send policy generated by the group-send management device. The group-send policy is generated according to an information parameter of an information scheduling device, and group messaging of the terminal device may change correspondingly when the information parameter of the information scheduling device changes. Therefore, group messaging becomes more flexible, thereby increasing a group-send success rate.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The term "and/or" in the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
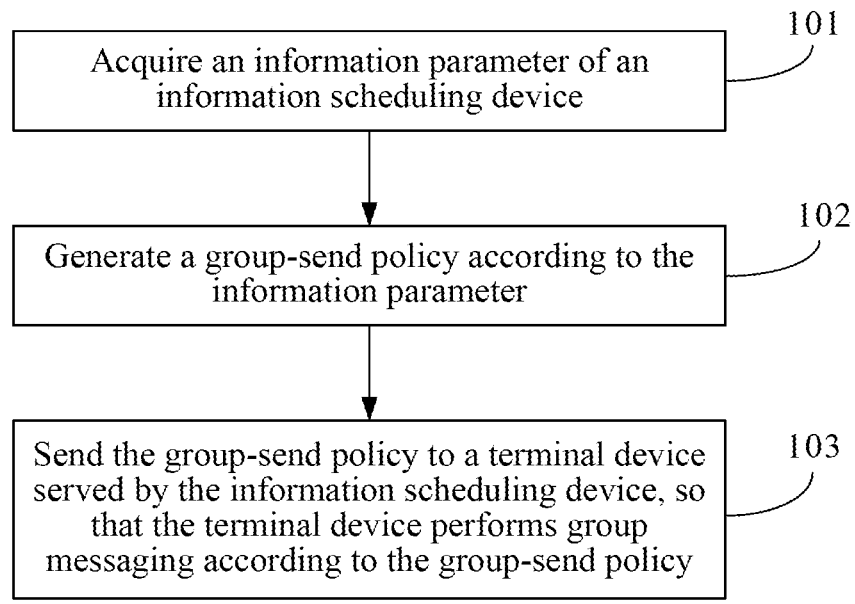
FIG. 1 is a flowchart of a group messaging method provided in an embodiment of the present invention.

An embodiment of the present invention provides a group messaging method, which is applied to a group-send management device. As shown in FIG. 1, the method includes:

Step 101: Acquire an information parameter of an information scheduling device.

It should be noted that a message in this embodiment of the present invention may include an SMS message, a multimedia message, and an IM, and may also include a QQ message, a fetion message, a wechat message, and the like. The information scheduling device is an information processing device provided by a telecom operator or an Internet company, and may be one or more entity devices, such as a short message service center (SMSC).

The information parameter may include: an average message-sending time, a message cache threshold, and busy/idle period distribution, and the like. The average message-sending time is an average time that the information scheduling device spends in successfully acquiring a message from a terminal device and forwarding the message. The message cache threshold is a maximum quantity of messages in a cache queue allocated for the terminal device by the information scheduling device. In actual application, allocation of a message cache threshold for a terminal device is generally differentiated according to an identifier of the terminal device, for example, a message cache threshold allocated for a same phone number is 10. The busy/idle period distribution is busy/idle period distribution of the information scheduling device in a year, for example, a busy period of the SMSC is generally at festivals, and an idle period of the SMSC is generally at night.

Step 102: Generate a group-send policy according to the information parameter.

The group-send policy may include: a sending interval, a quantity range, and a validity period of the policy.

As an example, the validity period of the policy may be first generated according to the busy/idle period distribution, and then a quantity range and a corresponding sending interval of each period in the validity period of the policy are generated according to the average message-sending time, the message cache threshold, and the validity period of the policy.

The sending interval and the quantity range of each period in the validity period of the policy are in a one-to-one correspondence. The sending interval of each period includes at least one first sending interval and at least one second sending interval, where the first sending interval is less than or equal to the average message-sending time, a minimum value of a first quantity range corresponding to the first sending interval is greater than or equal to the message cache threshold, the second sending interval is greater than the average message-sending time, and a maximum value of a second quantity range corresponding to the second sending interval is less than the message cache threshold.

Step 103: Send the group-send policy to a terminal device served by the information scheduling device, so that the terminal device performs group messaging according to the group-send policy.

In this way, a group-send management device is added to a group messaging system, so that a terminal device may perform group messaging according to a group-send policy generated by the group-send management device. The group-send policy is generated according to an information parameter of an information scheduling device, and group messaging of the terminal device may change correspondingly when the information parameter of the information scheduling device changes. Therefore, group messaging becomes more flexible, thereby increasing a group-send success rate.

Further, after step 103, the method may further include: receiving group-send execution data sent by each terminal device, where the group-send execution data includes a message-sending period, a region identifier of a sending party, and a sending success rate of a terminal. The method may further include processing the message-sending period, the region identifier of a sending party, and the sending success rate of a terminal that are sent by each terminal device, to obtain a sending success rate of each group-send area in each message-sending period, where at least one information scheduling device is disposed in each group-send area. The method may further include determining whether there is a group-send area, in each group-send area in each message-sending period, whose sending success rate is less than a first preset reference value. When a sending success rate of a first group-send area in a first message-sending period is less than the first preset reference value, the method may further include adjusting a group-send policy, for a relevant period of the first message-sending period, of a terminal device served by an information scheduling device in the first group-send area.

Alternatively, the method may further include receiving group-send execution data sent by each terminal device, where the group-send execution data includes a message-sending period, a region identifier of a sending party, a region identifier of a receiving party, and a sending success rate of a terminal. The method may further include processing the message-sending period, the region identifier of a sending party, the region identifier of a receiving party, and the sending success rate of a terminal that are sent by each terminal device, to obtain a receiving success rate of each group-send area in each message-sending period, where at least one information scheduling device is disposed in each group-send area. The method may further include determining whether there is a group-send area, in each group-send area in each message-sending period, whose receiving success rate is less than a second preset reference value. When a receiving success rate of a first group-send area in a first message-sending period is less than the second preset reference value, the method may further include adjusting a group-send policy, for a relevant period of the first message-sending period, of a terminal device served by an information scheduling device in the first group-send area.

The relevant period of the first message-sending period is a period relevant to the first message-sending period, and the relevant period of the first message-sending period and the first message-sending period comply with a preset rule between each other. There may be multiple methods of adjusting a group-send policy, for a relevant period of the first message-sending period, of a terminal device served by an information scheduling device in the first group-send area. As an example, a quantity range of the first message-sending period may be shortened, to obtain a quantity range of the relevant period of the first message-sending period, and/or, a sending interval of the first message-sending period may be extended, to obtain a sending interval of the relevant period of the first message-sending period.

In this way, the group-send management device can perform an effective adjustment of a relevant group-send policy according to group-send execution data received in real time, thereby further increasing a success rate of group messaging.

Figure 2:
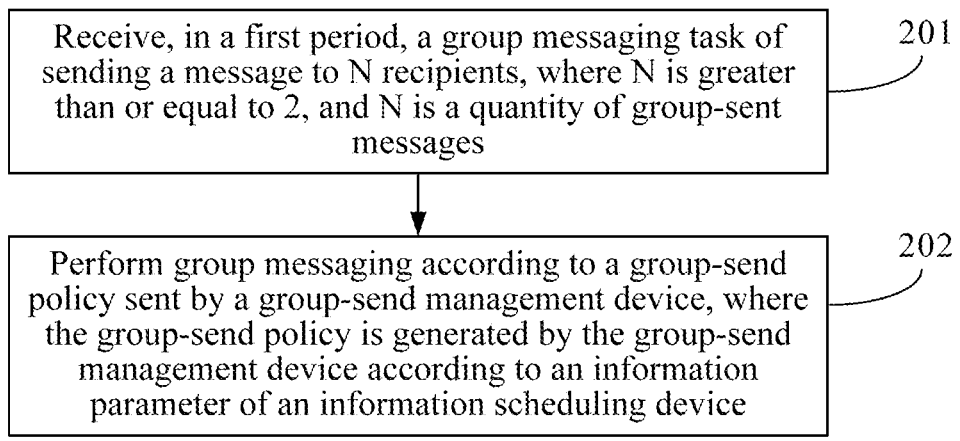
FIG. 2 is a flowchart of another group messaging method provided in an embodiment of the present invention.

An embodiment of the present invention provides a group messaging method, which is applied to a terminal device. As shown in FIG. 2, the method includes:

Step 201: Receive, in a first period, a group messaging task of sending a message to N recipients, where N is greater than or equal to 2, and N is a quantity of group-sent messages.

Step 202: Perform group messaging according to a group-send policy sent by a group-send management device, where the group-send policy is generated by the group-send management device according to an information parameter of an information scheduling device.

The group-send policy includes: a sending interval, a quantity range, and a validity period of the policy, where a sending interval and a quantity range of each period in the validity period of the policy are in a one-to-one correspondence.

Specifically, a specific quantity range in which the quantity N of group-sent messages is located in the first period may be first acquired from the group-send policy; then, a specific sending interval corresponding to the specific quantity range is acquired; and finally, group messaging is performed according to the specific sending interval.

In this way, a group-send management device is added to a group messaging system, so that a terminal device may perform group messaging according to a group-send policy generated by the group-send management device. The group-send policy is generated according to an information parameter of an information scheduling device, and group messaging of the terminal device may change correspondingly when the information parameter of the information scheduling device changes. Therefore, group messaging becomes more flexible, thereby increasing a group-send success rate.

Further, after step 202, the method may further include generating group-send execution data, where the group-send execution data includes a message-sending period, a region identifier of a sending party, and a sending success rate, or the group-send execution data includes a message-sending period, a region identifier of a sending party, a region identifier of a receiving party, and a sending success rate. The method may further include sending the group-send execution data to the group-send management device, so that the group-send management device adjusts the group-send policy according to the group-send execution data.

In this way, the group-send management device can perform an effective adjustment of a relevant group-send policy according to group-send execution data received in real time, thereby further increasing a success rate of group messaging.

It should be noted that, when performing group messaging according to the group-send policy, the terminal device may also display group-send state information on a display interface, where the group-send state information includes: a total quantity of recipients, a quantity of messages sent, and/or a recipient of a message that is being sent. After group messaging is finished, the terminal device may also display group-send result information on the display interface, where the group-send result information includes: a total quantity of recipients, a quantity of messages successfully sent, and/or a quantity of messages unsuccessfully sent. In this way, it is convenient for a user to query for a message-sending state and the user can learn about a sending situation of each message, thereby improving user experience.

Figure 3:
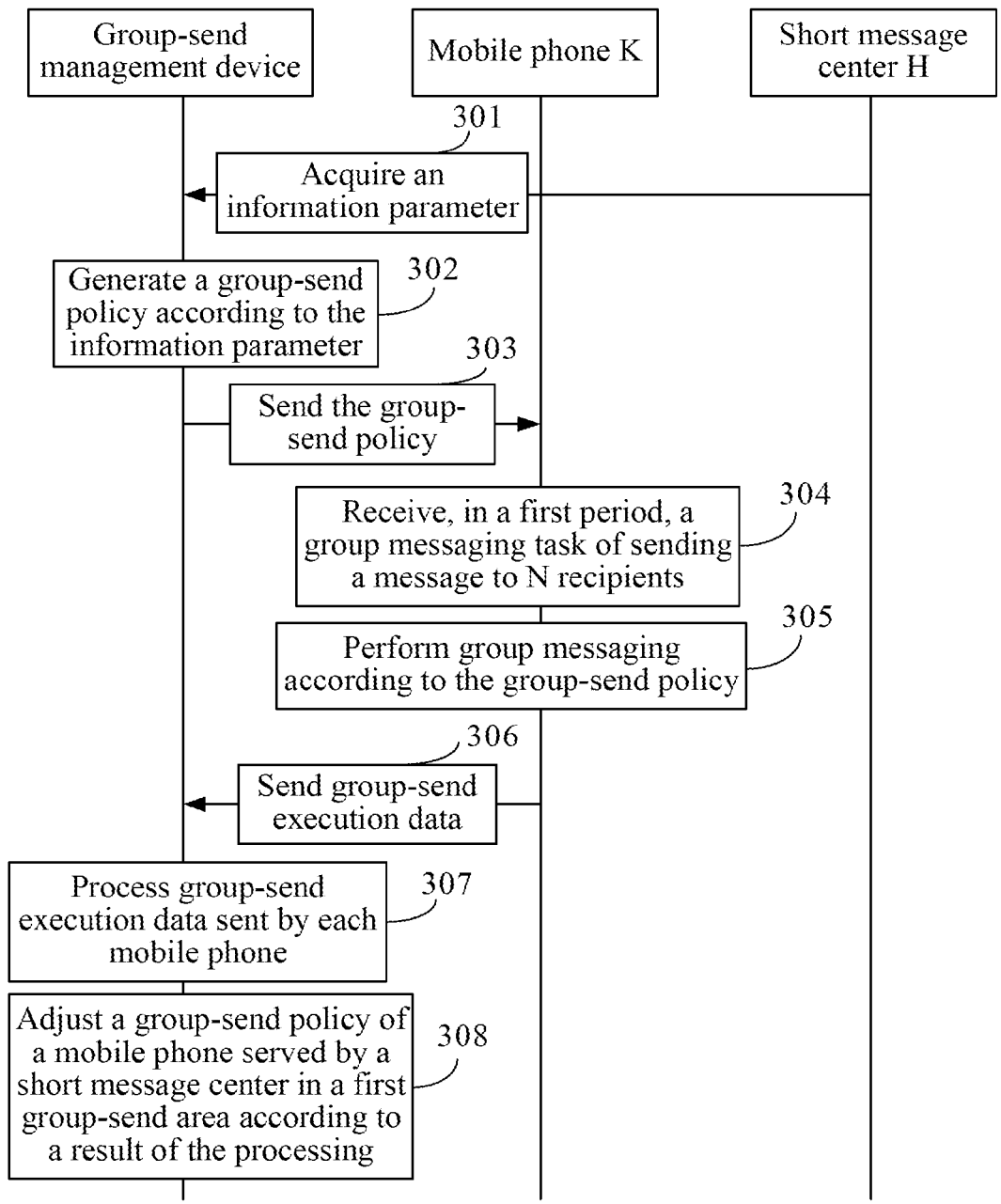
FIG. 3 is a flowchart of still another group messaging method provided in an embodiment of the present invention.

Because a message in the present invention may be an SMS message, a multimedia message, or an IM, and may also be a QQ message, a fetion message, or a wechat message, or the like, in an embodiment, it is assumed that a terminal device is a mobile phone, an information scheduling device is a short message center, and a group-sent message is an SMS message. Generally, there are multiple telecom operators, and each telecom operator provides a short message service for a corresponding mobile phone by using its short message center. Therefore, there may be multiple short message centers in a group messaging system. In this embodiment of the present invention, a group-send management device may serve a fixed short message center, or may serve multiple short message centers, which is not limited in the present invention. A mobile phone K and a short message center H are used as an example in this embodiment, and the short message center H provides a service for the mobile phone K, that is, an SMS message of the mobile phone K is scheduled by the short message center H. Specifically, this embodiment of the present invention provides a group messaging method, which, as shown in FIG. 3, includes:

Step 301: The group-send management device acquires an information parameter of the short message center H.

Specifically, the group-send management device may acquire, via an information interface of a short message center of each telecom operator, an information parameter of each short message center, and in the process of acquiring the information parameter, the group-send management device may proactively acquire the information parameter, or the group-send management device may also passively receive the information parameter, which is not limited in the present invention. In this embodiment, the group-send management device may acquire an information parameter of the short message center H via an information interface between the group-send management device and the short message center H, where the information parameter may include: an average message-sending time, a message cache threshold, and busy/idle period distribution, and the like. The average message-sending time is an average time that the short message center H spends in successfully acquiring a message from the mobile phone K and forwarding the message, and the message cache threshold is a maximum quantity of messages in a message cache queue allocated for the mobile phone K by the short message center H. In actual application, allocation of a message cache threshold is generally differentiated according to a phone number. Therefore, the message cache threshold may be a maximum quantity of messages in a message cache queue allocated for a phone number corresponding to the mobile phone K by the short message center H. The busy/idle period distribution is busy/idle period distribution of the short message center in a year, as in a busy/idle period distribution table shown in Table 1. Table 1 records multiple busy/idle periods, such as a busy period 1 starting from Jan. 1, 2012 to Jun. 30, 2012, an idle period 3 starting from 02:00 to 05:00, and a busy period 4 starting from Dec. 25, 2012, 14:00 to Dec. 26, 2012, 6:00. Specifically, the busy/idle periods are divided according to date, time, and date-time in the Type entry, where priorities of date, time, and date-time are in an ascending order. For example, it can be seen from the busy period 1 that a period from 03:00 to 04:00 on Jan. 1, 2012 is a busy period, but it can be seen from the idle period 3 that a period from 03:00 to 04:00 on Jan. 1, 2012 is an idle period. A division type of the busy period 1 is date, and a division type of the idle period 3 is time. Because the priority of time is higher than the priority of date, the period from 03:00 to 04:00 on Jan. 1, 2012 is an idle period.

TABLE 1

| Period | Type | Start | End |
|---|---|---|---|
| Busy Period 1 | Date | 2012/1/1 | 2012/6/30 |
| Busy Period 2 | Date | 2012/7/1 | 2012/12/31 |
| Idle Period 3 | Time | 02:00 | 05:00 |
| Busy Period 4 | Date-time | 2012/12/25 14:00 | 2012/12/26 6:00 |

Step 302: The group-send management device generates a group-send policy according to the information parameter.

The group-send management device may generate a validity period of the policy according to the busy/idle period distribution. Specifically, the group-send management device may directly generate a table, as shown in Table 2, of the validity period of the policy according to the busy/idle period distribution table shown in Table 1. For example, validity periods of policies are separately a period 1, a period 2, a period 3, and a period 4, where a group-send policy 1 takes effect in the period 1, a group-send policy 2 takes effect in the period 2, a group-send policy 3 takes effect in the period 3, and a group-send policy 4 takes effect in the period 4. The validity periods of the policies are divided according to date, time, and date-time in the Type entry, and priorities of date, time, and date-time are in an ascending order.

TABLE 2

| Period | Type | Start | End | Group-send Policy |
|---|---|---|---|---|
| Period 1 | Date | 2012/1/1 | 2012/6/30 | Group-send policy 1 |
| Period 2 | Date | 2012/7/1 | 2012/12/31 | Group-send policy 2 |
| Period 3 | Time | 02:00 | 05:00 | Group-send policy 3 |
| Period 4 | Date-time | 2012/12/25 14:00 | 2012/12/26 6:00 | Group-send policy 4 |

Specifically, the group-send management device may also divide the busy/idle period distribution shown in Table 1 into finer periods according to a preset rule and generate a table, as shown in Table 3, of validity periods of policies. For example, the busy period 2 in Table 1, namely, a period from Jul. 1, 2012 to Dec. 31, 2012, is divided into 3 periods, which are separately a period 4, a period 5, and a period 6, where a group-send policy 4 takes effect in the period 4, a group-send policy 5 takes effect in the period 5, and a group-send policy 6 takes effect in the period 6. In this way, finer division of the validity period of the policy is implemented, so that a group-send policy used by a mobile phone in group messaging is more accurate and more effective, thereby increasing a success rate of group messaging. The validity period of the policy is divided according to date, time, and date-time in the Type entry, and priorities of date, time, and date-time are in an ascending order.

TABLE 3

| Period | Type | Start | End | Group-send Policy |
|---|---|---|---|---|
| Period 1 | Date | 2012/1/1 | 2012/6/30 | Group-send policy 1 |
| Period 2 | Time | 02:00 | 05:00 | Group-send policy 2 |
| Period 3 | Date-time | 2012/12/25 14:00:00 | 2012/12/26 6:00:00 | Group-send policy 3 |
| Period 4 | Date | 2012/7/1 | 2012/8/1 | Group-send policy 4 |
| Period 5 | Date | 2012/8/2 | 2012/9/1 | Group-send Policy 5 |
| Period 6 | Date | 2012/9/2 | 2012/12/31 | Group-send Policy 6 |

In addition, the group-send management device may generate a quantity range and a corresponding sending interval of each period in the validity period of the policy according to the average message-sending time, the message cache threshold, and the validity period of the policy. The sending interval and the quantity range of each period in the validity period of the policy are in a one-to-one correspondence. The sending interval of each period includes at least one first sending interval and at least one second sending interval, where the first sending interval is less than or equal to the average message-sending time, a minimum value of a first quantity range corresponding to the first sending interval is greater than or equal to the message cache threshold, the second sending interval is greater than the average message-sending time, and a maximum value of a second quantity range corresponding to the second sending interval is less than the message cache threshold. In this way, each validity period of the policy includes at least one corresponding range in which a quantity of group-sent messages is less than or equal to the message cache threshold, and at least one corresponding range in which a quantity of group-sent messages is greater than the message cache threshold, that is, at least one first quantity range and at least one second quantity range are included. Therefore, comprehensiveness of the group-send policy for the mobile phone K to perform group messaging is ensured.

In actual application, there may be multiple first quantity ranges and multiple second quantity ranges in each group-send validity period and division may be performed according to a specific situation, so that the group-send policy is more accurate and more effective. As an example, as shown in Table 4, Table 4 corresponds to Table 2. It is assumed that the group-send management device obtains four group-send validity periods through division, and group-send policies of the group-send management device are separately group-send policies 1, 2, 3, and 4. A sending interval and a quantity range of each period in the validity periods of the policies are in a one-to-one correspondence. For example, when the group-send policy 1 is applied in the period 1, a sending interval and a quantity range of the group-send policy 1 are in a one-to-one correspondence, that is, a quantity range T1 is (0,10], and a corresponding sending interval d1 is 1 s, a quantity range T2 is (10,20], and a corresponding sending interval d2 is 2 s, and a quantity range T3 is (20,30], and a corresponding sending interval d3 is 4 s, and the like. The sending interval of each period includes at least one first sending interval and at least one second sending interval, where the first sending interval is less than or equal to the average message-sending time, a minimum value of a first quantity range corresponding to the first sending interval is greater than or equal to the message cache threshold, the second sending interval is greater than the average message-sending time, and a maximum value of a second quantity range corresponding to the second sending interval is less than the message cache threshold. In this embodiment, assuming that the average message-sending time is 7 s, and that the message cache threshold is 30, the group-send policy 1 is applied in the period 1, that is, there are three first sending intervals in the period 1, which are separately a first sending interval d1, a first sending interval d2, and a first sending interval d3. Three quantity ranges that are in a one-to-one correspondence with the three first sending intervals are a quantity range T1, a quantity range T2, and a quantity range T3, respectively; and there are a second sending interval d4 and a second quantity range T4 corresponding to the second sending interval d4.

the working state of the short message center H need to be registered and recorded in the group-send management device, so that the group-send policy is sent to a corresponding mobile phone. Particularly, working state information of the short message center H is reported to the group-send management device when another mobile phone reports a group-send task log.

Step 304: The mobile phone K receives, in a first period, a group messaging task of sending a message to N recipients.

N is greater than or equal to 2, and N is a quantity of group-sent messages.

Step 305: The mobile phone K performs group messaging according to the group-send policy.

The mobile phone K may first acquire, from the group-send policy, a specific quantity range in which the quantity N of group-sent messages is located in the first period; then acquire a specific sending interval corresponding to the specific quantity range; and finally, perform group messaging according to the specific sending interval. As an example, in this embodiment, it is assumed that the first period is from 15:00 to 15:05 on Dec. 25, 2012, N is 15 and the mobile phone K receives the group-send policy including content of Table 2 and Table 4. The mobile phone K first queries, in the group-send policy, for a first period in which the quantity 15 of group-sent messages is located, namely, a specific quantity range in which the period from 15:00 to 15:05 on Dec. 25, 2012 is located. It can be seen from Table 2 that a validity period of the policy from 15:00 to 15:05 on Dec. 25, 2012 is the period 4, and the period 4 corresponds to the group-send policy 4; and it can be seen from Table 4 that, in the group-send policy 4, the quantity 15 of group-sent messages is located in (10,20] namely, the range T2. As a result, the obtained specific quantity range is the range T2. Then, it is acquired that a specific sending interval corresponding to the range T2 is d2, namely, 5 s. Finally, the mobile phone K may perform group messaging at a sending interval of 5 s. Specifically, the mobile phone K sequences SMS messages according to the recipients, and a sequencing method is the same as that in the prior art, which is not limited in the present invention. Then the mobile phone K sends the SMS messages one by one to the short message center H, where a sending interval of each SMS message is 5 s, and the short message center H forwards each SMS message. After an SMS message is forwarded successfully, the short message center H needs to send a response message

TABLE 4

| Period | Group-send Policy | T1 | d1 | T2 | d2 | T3 | d3 | T4 | d4 |
|---|---|---|---|---|---|---|---|---|---|
| Period 1 | Group-send policy 1 | (0, 10] | 1 | (10, 20] | 2 | (20, 30] | 4 | (30, 50] | 8 |
| Period 2 | Group-send policy 2 | (0, 10] | 1 | (10, 20] | 3 | (20, 30] | 5 | (30, 50] | 10 |
| Period 3 | Group-send policy 3 | (0, 10] | 2 | (10, 20] | 4 | (20, 30] | 6 | (30, 50] | 10 |
| Period 4 | Group-send policy 4 | (0, 10] | 2 | (10, 20] | 5 | (20, 30] | 8 | (30, 50] | 12 |

Step 303: The group-send management device sends the group-send policy to the mobile phone K served by the short message center H.

The group-send policy may be sent to the mobile phone in a form of a file, such as an extensible markup language (XML) file.

It should be noted that, because short message service quality of the mobile phone K is relevant to a working state of the short message center H to which the mobile phone K belongs, a correspondence between the home short message center H of the mobile phone K and the mobile phone K and to the mobile phone K, so that the mobile phone K provides a new SMS message, until all SMS messages are sent completely.

Particularly, in the process of performing group messaging, the mobile phone may display group-send state information on a display interface of the mobile phone, where the group-send state information may include: a total quantity of recipients, a quantity of messages sent, and/or a recipient of a message that is being sent, that is, whom the message is sending to. Remaining time of sending may also be displayed, and in actual application, remaining time is displayed when it is greater than or equal to a preset time threshold, where the preset time threshold may be 1 minute. The group-send state information may also include a sending state of a message sent, such as sending succeeded or sending failed. In addition, a link of message-sending details may also be included. After a mobile phone user taps the link, more detailed group-send state information, such as a sending time point, a home region of a recipient, may be displayed on the display interface.

After group messaging is finished, the mobile phone may display group-send result information on the display interface of the mobile phone, where the group-send result information includes: a total quantity of recipients, a quantity of messages successfully sent, and/or a quantity of messages unsuccessfully sent. In addition, a link of message-sending details may also be included. After the mobile phone user taps the link, more detailed group-send state information, such as a sending time point, a home region of the recipient, may be displayed on the display interface.

In this way, the user can clearly learn about a progress and a result of group messaging in real time by using the display interface of the mobile phone, thereby effectively improving user experience.

Step 306: The mobile phone K sends group-send execution data to the group-send management device.

First, the mobile phone K generates the group-send execution data, where the group-send execution data includes a message-sending period, a region identifier of a sending party, and a sending success rate, or the group-send execution data includes a message-sending period, a region identifier of a sending party, a region identifier of a receiving party, and a sending success rate. In this embodiment, the message-sending period is the first period, and the group-send execution data may include: a message-submitting time, the specific sending interval, and the like. The region identifier of a receiving party includes a region identifier of a receiving party that receives a message successfully and a region identifier of a receiving party that fails to receive a message. In this embodiment, the region identifier of a sending party may be a region identifier, such as Shenzhen in Guangdong province, of a home region of a phone number corresponding to the mobile phone that executes group messaging and the region identifier of a receiving party may be a region identifier, such as Beijing, of a home region of a phone number of an SMS message recipient. Particularly, an identifier of an information scheduling device is an identifier of an information scheduling device serving the mobile phone, and in actual application, the mobile phone may further report an identifier of a home operator of the phone number. The group-send management device differentiates, according to the identifier of the home operator of the phone number, an information scheduling device in a group-send area to which the information scheduling device belongs.

Then, the mobile phone K sends the group-send execution data to the group-send management device, so that the group-send management device adjusts the group-send policy according to the group-send execution data.

Step 307: The group-send management device processes group-send execution data sent by each mobile phone.

The group-send management device may adjust a group-send policy according to multiple criteria. As an example, the group-send management device may adjust the group-send policy based on a sending success rate and/or a receiving success rate. When the sending success rate is used as a basis for a group-send policy adjustment, corresponding group-send execution data is acquired, where the group-send execution data includes a message-sending period, a region identifier of a sending party, and a sending success rate; and when the receiving success rate is used as a basis for a group-send policy adjustment, corresponding group-send execution data is acquired, where the group-send execution data includes a message-sending period, a region identifier of a sending party, a region identifier of a receiving party, and a sending success rate. The group-send management device may process group-send execution data differently according to different group-send execution data.

Optionally, when the group-send execution data includes a message-sending period, a region identifier of a sending party, and a sending success rate of a terminal, after receiving the group-send execution data sent by each terminal device, the group-send management device first processes the message-sending period, the region identifier of a sending party, and the sending success rate of a terminal that are sent by each terminal device, to obtain a sending success rate of each group-send area in each message-sending period, where at least one information scheduling device is disposed in each group-send area; and then, the group-send management device determines whether there is a group-send area, in each group-send area in each message-sending period, whose sending success rate is less than a first preset reference value. When a sending success rate of a first group-send area in a first message-sending period is less than the first preset reference value, step 308 is performed; and when a sending success rate of a first group-send area in a first message-sending period is greater than or equal to the first preset reference value, the group-send policy does not need to be adjusted.

When the group-send execution data includes a message-sending period, a region identifier of a sending party, a region identifier of a receiving party, and a sending success rate of a terminal, the group-send execution data sent by each terminal device is received. After receiving the group-send execution data sent by each terminal device, the group-send management device first processes the message-sending period, the region identifier of a sending party, the region identifier of a receiving party, and the sending success rate of a terminal that are sent by each terminal device, to obtain a receiving success rate of each group-send area in each message-sending period, where at least one information scheduling device is disposed in each group-send area; and then, the group-send management device determines whether there is a group-send area, in each group-send area in each message-sending period, whose receiving success rate is less than a second preset reference value. When a receiving success rate of a first group-send area in a first message-sending period is less than the second preset reference value, step 308 is performed; and when a receiving success rate of a first group-send area in a first message-sending period is greater than or equal to the second preset reference value, the group-send policy does not need to be adjusted.

When a sending success rate and a receiving success rate are used as bases for a group-send policy adjustment, when both a sending success rate and a receiving success rate of a first group-send area in a first message-sending period are less than a corresponding preset reference value, a group-send policy of a terminal device served by an information scheduling device in a group-send area 1 needs to be adjusted, that is, step 308 is performed; or when either a sending success rate or a receiving success rate of a first group-send area in a first message-sending period is less than a corresponding preset reference value, a group-send policy of a terminal device served by an information scheduling device in a group-send area 1 needs to be adjusted, that is, step 308 is performed.

In this embodiment, at least one information scheduling device disposed in the group-send area is a short message center, and particularly, the group-send area may be specifically set according to an actual situation. As an example, the group-send area may be a specific region, such as Chaoyang District in Beijing, and multiple information scheduling devices may be included in the specific area. The group-send area may also be an area in which a separate information scheduling device is located, that is, only one information scheduling device exists in the group-send area, and generally in this case, an identifier of the information scheduling device may be directly used to identify the group-send area. As an example, when a mobile phone with a phone number A sends three group-sent SMS messages to mobile phones with phone numbers B, C, and D, assuming that the SMS messages are sent to the mobile phones with the phone numbers B and C successfully, and the SMS message fails to be sent to the mobile phone with the phone number D, group-send execution data sent by the mobile phone with the phone number A may include: a home region of the phone number A at a transmit end, a home region of the phone number D that fails to receive the message, home regions of the phone numbers B and C that receive the messages successfully, and a sending success rate of the terminal with the phone number A (where the sending success rate is ⅔), and may further include: a home operator of the phone number A, such as China Mobile.

As an example, for a specific group-send area M, the group-send management device may process a sending success rate of each terminal in the group-send area M, to obtain a sending success rate of the group-send area M in each period. Specifically, an average value of sending success rates of all the terminals in each period may be calculated, or weighted averaging may be performed on the sending success rates of all the terminals, which is not limited in this embodiment of the present invention. The group-send management device may further determine whether the group-send area M of the group-send management device includes a region indicated by the region identifier of each receiving party. If the group-send area M includes a specific region indicated by the region identifier of each receiving party, statistics of a quantity of receiving parties corresponding to the specific region are collected, where the quantity of receiving parties includes: a receiving success count and a receiving fail count. The group-send management device collects statistics of a receiving success count and a receiving fail count of a mobile phone in the group-send area M, and calculates a receiving success rate according to the receiving success count and the receiving fail count. As shown in Table 5, assuming that the sending success rate of the group-send area 1 in the first message-sending period is 0.80, namely, 80 percent, the receiving success count is 500, and a receiving fail count is 500, Receiving success rate=Receiving success count/(Receiving success count+Receiving fail count). Therefore, it is calculated that a receiving success rate in the first message-sending period is 0.50.

TABLE 5

| | Group-send Statistics Data | | | |
| Group-send Area | Sending Success Rate | Receiving Success Count | Receiving Fail Count | Receiving Success Rate |
| --- | --- | --- | --- | --- |
| Group-send area 1 | 0.80 | 500 | 500 | 0.50 |
| Group-send area 2 | 0.90 | 600 | 400 | 0.60 |
| Group-send area 3 | 0.70 | 700 | 300 | 0.70 |
| Group-send area 4 | 0.60 | 800 | 200 | 0.80 |

The group-send area 1 in Table 5 is used as an example. It is assumed that in the first message-sending period, the first preset reference value is 0.70, the second preset reference value is 0.60, and it is obtained through processing that the sending success rate is 0.8 and the receiving success rate is 0.50. When the sending success rate is used as a basis for a group-send policy adjustment, a group-send policy of a terminal device served by an information scheduling device in the group-send area 1 does not need to be adjusted, because the receiving success rate 0.80 is greater than the first preset reference value 0.70. When the receiving success rate is used as a basis for a group-send policy adjustment, a group-send policy of a terminal device served by an information scheduling device in the group-send area 1 needs to be adjusted, because the receiving success rate 0.50 is less than the second preset reference value 0.60. When the sending success rate and the receiving success rate are used as bases for a group-send policy adjustment, in this embodiment, it is assumed that both the sending success rate and the receiving success rate of the first group-send area in the first message-sending period are less than a corresponding preset reference value, a group-send policy of a terminal device served by an information scheduling device in the group-send area 1 needs be adjusted. Because the receiving success rate 0.80 is greater than the first preset reference value 0.70, and the receiving success rate 0.50 is less than the second preset reference value 0.60, a group-send policy of a terminal device served by an information scheduling device in the group-send area 1 does not need to be adjusted, where the group-send area 1 is the first group-send area.

It should be noted that, the first group-send area and the first message-sending period are merely an example for description, and the first preset reference value and the second preset reference value may be the same, or may be different. The mobile phone served by the short message center in the first group-send area may include the mobile phone K, or may not include the mobile phone K, which, in actual application, is determined according to whether an area in which the short message center H that serves the mobile phone is located is the first group-send area. In this embodiment, assuming that it is determined, according to a result of the processing, that the group-send policy of the mobile phone served by the short message center in the first group-send area needs to be adjusted, step 308 is performed.

Step 308: The group-send management device adjusts, according to a result of the processing, the group-send policy of the mobile phone served by the short message center in the first group-send area.

Because the quantity range and the corresponding sending interval of each period in the validity period of the policy are generated according to the average message-sending time, the message cache threshold, and the validity period of the policy, in a case in which the average message-sending time and the validity period of the policy are not changed, a new message cache threshold can be obtained by reducing the message cache threshold in the first message-sending period, and a new group-send policy is generated according to the average message-sending time, the new message cache threshold, and the validity period of the policy and the new group-send policy is used as a group-send policy of the terminal device served by the information scheduling device in the first group-send area, where a quantity range of a relevant period of the first message-sending period is shortened compared with the original quantity range of the first message-sending period, and a sending interval of a relevant period of the first message-sending period is extended compared with the original sending interval of the first message-sending period. Particularly, the group-send management device may also directly shorten a quantity range of the first message-sending period, to obtain a quantity range of a relevant period of the first message-sending period, and/or, extend a sending interval of the first message-sending period, to obtain a sending interval of a relevant period of the first message-sending period.

It should be noted that, the relevant period of the first message-sending period is a relevant period that complies with a preset rule with the first message-sending period. As an example, the relevant period of the first message-sending period may be the same as the first message-sending period. If the first message-sending period is in the period 3 in Table 2, the relevant period of the first message-sending period is the period 3. The relevant period of the first message-sending period may be a period that is obtained through processing according to the first message-sending period and terminal device served by the information scheduling device in the first group-send area. As shown in Table 6, a quantity range of the first message-sending period may be directly shortened, to obtain a quantity range of the relevant period of the first message-sending period, and/or, a sending interval of the first message-sending period may be extended, to obtain a sending interval of the relevant period of the first message-sending period. As an example, a maximum value of the range T3 in the period 4 may be reduced to 25, a minimum value of the range T4 in the period 4 may be reduced to 25, so that a range T3 (20,25] and a range T4 (25,50] in a preset period are obtained. 1 s may be added to each sending interval in the period 4, to obtain a new sending interval, where d1 is 3 s, d2 is 6 s, d3 is 9 s, and d4 is 13 s. Particularly, a maximum value and a minimum value of each range in the period 4 may also be separately reduced, to obtain a range of the relevant period of the first message-sending period, which is not limited in the present invention. A group-send policy for the relevant period of the first message-sending period is adjusted by shortening the original quantity range and extending the original sending interval, so that a progress, on a mobile phone, of submitting an SMS message in the relevant period of the first message-sending period becomes slower than that in the first message-sending period, thereby reducing a probability that a cache queue of a number corresponding to the mobile phone is filled up and overflowed on the short message center side of an operator, reducing service burden for a short message center with overloaded service burden in a specific period, and increasing a message-sending success rate.

TABLE 6

| Period | Group-send Policy | T1 | d1 | T2 | d2 | T3 | d3 | T4 | d4 |
| --- | --- | --- | --- | --- | --- | --- | --- | --- | --- |
| Period 4 | Original group-send policy | (0, 10] | 2 | (10, 20] | 5 | (20, 30] | 8 | (30, 50] | 12 |
| Relevant period of the first message-sending period | New group-send policy | (0, 10] | 3 | (10, 20] | 6 | (20, 25] | 9 | (25, 50] | 13 | is similar to the first message-sending period in terms of time. For example, the relevant period of the first message-sending period may differ from the first message-sending period by a defined numerical value in terms of year, date, or month. Assuming that the first message-sending period is in the period 1 in Table 2, the relevant period of the first message-sending period may be starting from Jan. 1, 2013 to Jun. 30, 2013.

In this embodiment, assuming that the first message-sending period is from 15:00 to 15:05 on Dec. 25, 2012, it can be seen from Table 2 that the first message-sending period is in the period 4. Therefore, the period 4 and the group-send policy 4 corresponding to the period 4 that are in Table 4 may be obtained. Assuming that the original average message-sending time is 7 s, the original message cache threshold is 30, and the relevant period of the first message-sending period is from 14:00 on Dec. 25, 2013 to 6:00 on Dec. 26, 2013, 6:00, as an example, the message cache threshold in the first message-sending period may be reduced, to obtain that a message cache threshold in the relevant period of the first message-sending period is 25, and then a new group-send policy is generated according to the average message-sending time, the new message cache threshold, and the validity period of the policy, and the new group-send policy is used as a group-send policy of the It should be noted that, a sequence of the steps in the group messaging method provided in this embodiment of the present invention may be adjusted appropriately, and steps may also be accordingly added or ignored as required. A variation can be readily figured out by a person skilled in the art without departing from the technical scope disclosed in the present invention shall fall within the protection scope of the present invention, and details are not described herein again.

Figure 4:
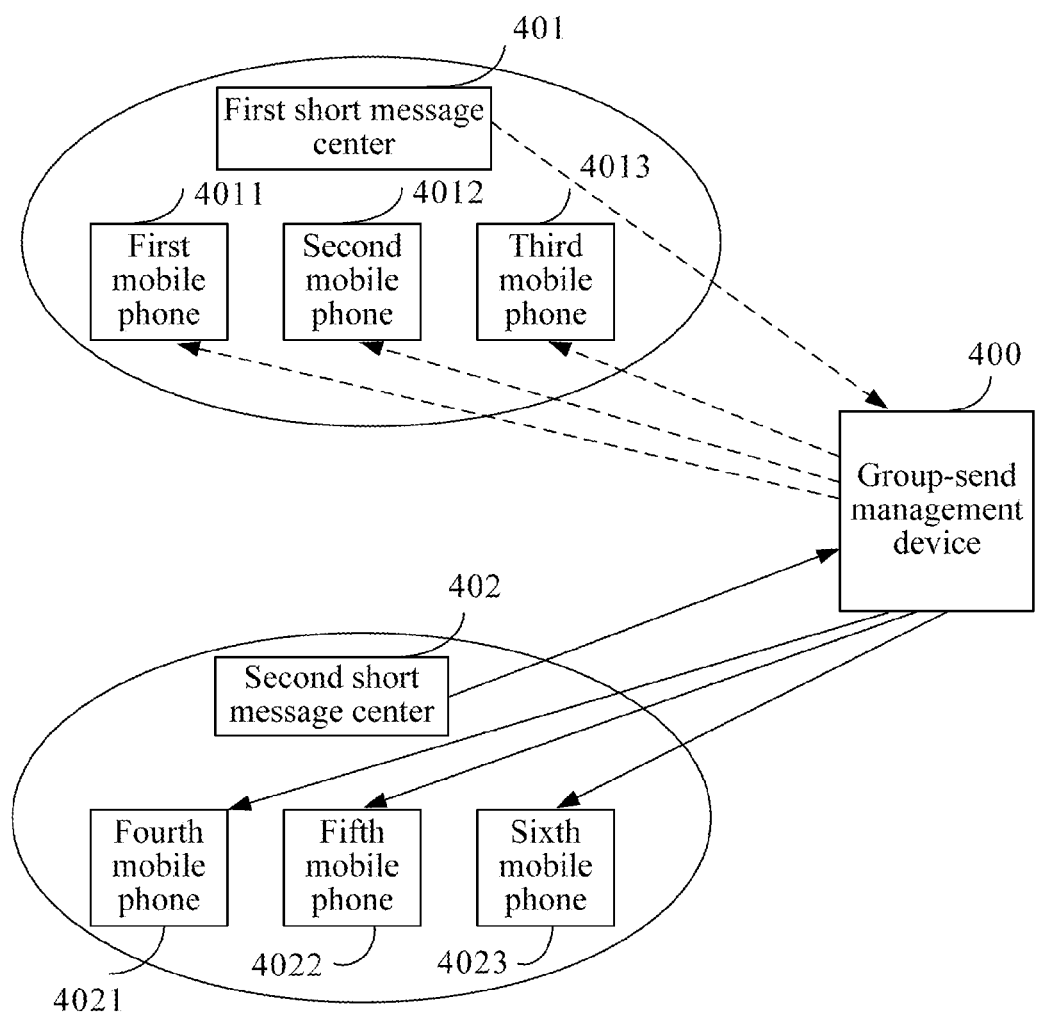
FIG. 4 is a schematic diagram of a group messaging system provided in an embodiment of the present invention.

Because there may be multiple short message centers and mobile phones in an information scheduling system, in this embodiment, the mobile phone K and the short message center H are merely for exemplary description. For operations in a scenario in which another short message center and mobile phone are used, reference may be correspondingly made to this embodiment. Particularly, a group-send management device may provide different group-send policies for mobile phones served by different short message centers. As an example, as shown in FIG. 4, it is assumed that a group-send management device 400 serves a first short message center 401 and a second short message center 402, where mobile phones served by the first short message center 401 are separately a first mobile phone 4011, a second mobile phone 4012, and a third mobile phone 4013, and mobile phones served by the second short message center

402 are separately a fourth mobile phone 4021, a fifth mobile phone 4022, and a sixth mobile phone 4023. Dashed lines with arrows in FIG. 4 represent an information flow between the group-send management device 400 and the first short message center 401 and information flows between the group-send management device 400 and the mobile phones served by the first short message center 401, and solid lines with arrows represent an information flow between the group-send management device 400 and the second short message center 402 and information flows between the group-send management device 400 and the mobile phones served by the second short message center 402. For example, when acquiring an information parameter a of the first short message center 401, the group-send management device 400 generates a group-send policy b according to the information parameter a, and then separately sends the group-send policy b to the first mobile phone 4011, the second mobile phone 4012, and the third mobile phone 4013.

In the group messaging method provided in this embodiment of the present invention, a group-send management device is added to a group messaging system, so that a terminal device may perform group messaging according to a group-send policy generated by the group-send management device. The group-send policy is generated according to an information parameter of an information scheduling device, and group messaging of the terminal device may change correspondingly when the information parameter of the information scheduling device changes. Therefore, group messaging becomes more flexible, thereby increasing a group-send success rate.

Figure 5:
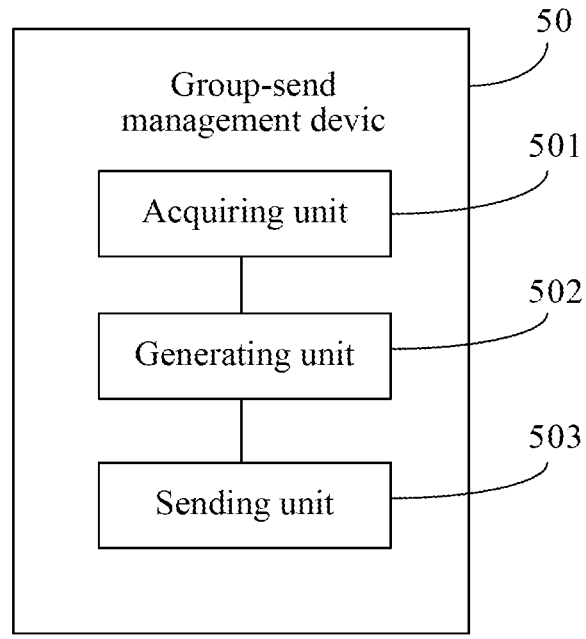
FIG. 5 is a schematic structural diagram of a group-send management device provided in an embodiment of the present invention.

An embodiment of the present invention provides a group-send management device 50. As shown in FIG. 5, the device includes: an acquiring unit 501, a generating unit 502, and a sending unit 503.

The acquiring unit 501 is configured to acquire an information parameter of an information scheduling device.

The information parameter includes: an average message-sending time, a message cache threshold, and busy/idle period distribution.

The generating unit 502 is configured to generate a group-send policy according to the information parameter.

The group-send policy includes: a sending interval, a quantity range, and a validity period of the policy.

The generating unit 502 is specifically configured to generate the validity period of the policy according to the busy/idle period distribution, and generate a quantity range and a corresponding sending interval of each period in the validity period of the policy according to the average message-sending time, the message cache threshold, and the validity period of the policy, where the sending interval and the quantity range of each period in the validity period of the policy are in a one-to-one correspondence. The sending interval of each period includes at least one first sending interval and at least one second sending interval, where the first sending interval is less than or equal to the average message-sending time, a minimum value of a first quantity range corresponding to the first sending interval is greater than or equal to the message cache threshold, the second sending interval is greater than the average message-sending time, and a maximum value of a second quantity range corresponding to the second sending interval is less than the message cache threshold.

The sending unit 503 is configured to send the group-send policy to a terminal device served by the information scheduling device, so that the terminal device performs group messaging according to the group-send policy.

In this way, a group-send management device is added to a group messaging system, so that a terminal device may perform group messaging according to a group-send policy generated by the group-send management device. The group-send policy is generated according to an information parameter of an information scheduling device, and group messaging of the terminal device may change correspondingly when the information parameter of the information scheduling device changes. Therefore, group messaging becomes more flexible, thereby increasing a group-send success rate.

Figure 6:
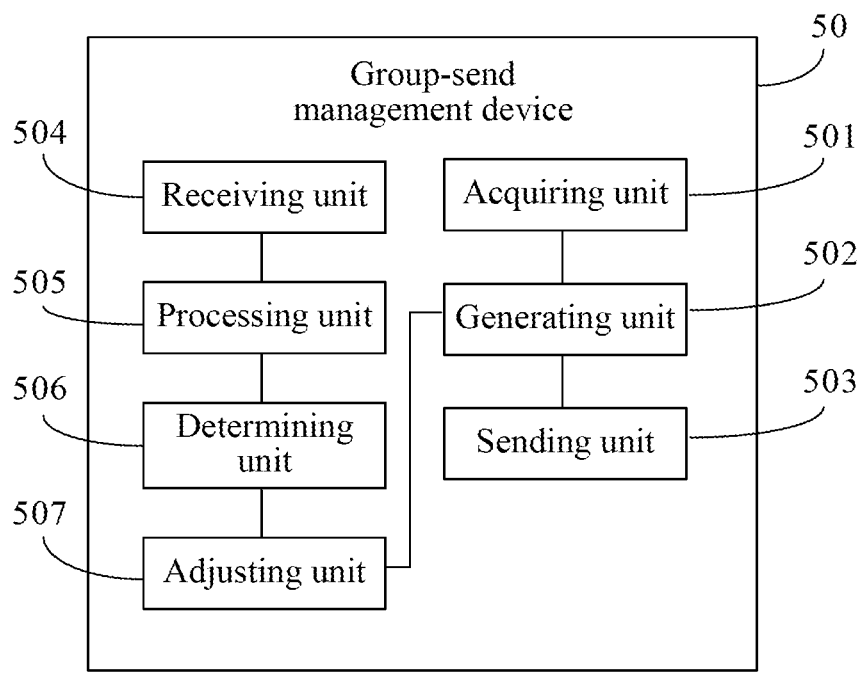
FIG. 6 is a schematic structural diagram of another group-send management device provided in an embodiment of the present invention.

Further, as shown in FIG. 6, the group-send management device 50 further includes a receiving unit 504 configured to receive, after the sending unit 503 sends the group-send policy to the terminal device served by the information scheduling device, group-send execution data sent by each terminal device, where the group-send execution data includes a message-sending period, a region identifier of a sending party, and a sending success rate of a terminal, or the group-send execution data includes a message-sending period, a region identifier of a sending party, a region identifier of a receiving party, and a sending success rate of a terminal A processing unit 505 is configured to process the message-sending period, the region identifier of a sending party, and the sending success rate of a terminal that are received by the receiving unit 504, to obtain a sending success rate of each group-send area in each message-sending period, or process the message-sending period, the region identifier of a sending party, the region identifier of a receiving party, and the sending success rate of a terminal that are received by the receiving unit, to obtain a receiving success rate of each group-send area in each message-sending period, where at least one information scheduling device is disposed in each group-send area. A determining unit 506 is configured to determine whether there is a group-send area, in each group-send area in each message-sending period, whose sending success rate is less than a first preset reference value; or determine whether there is a group-send area, in each group-send area in each message-sending period, whose receiving success rate is less than a second preset reference value. An adjusting unit 507 is configured to: when the determining unit 506 learns that a sending success rate of a first group-send area in a first message-sending period is less than the first preset reference value, or when the determining unit 506 learns that a receiving success rate of a first group-send area in a first message-sending period is less than the second preset reference value, adjust a group-send policy, for a relevant period of the first message-sending period, of a terminal device served by an information scheduling device in the first group-send area. When adjusting the group-send policy, for the relevant period of the first message-sending period, of the terminal device served by the information scheduling device in the first group-send area, the adjusting unit 507 is specifically configured to shorten a quantity range of the first message-sending period, to obtain a quantity range of the relevant period of the first message-sending period, and/or extend a sending interval of the first message-sending period, to obtain a sending interval of the relevant period of the first message-sending period.

In this embodiment of the present invention, a group-send management device is added to a group messaging system, so that a terminal device may perform group messaging according to a group-send policy generated by the group-send management device. The group-send policy is generated according to an information parameter of an information scheduling device, and group messaging of the terminal device may change correspondingly when the information parameter of the information scheduling device changes. Therefore, group messaging becomes more flexible, thereby increasing a group-send success rate.

Figure 7:
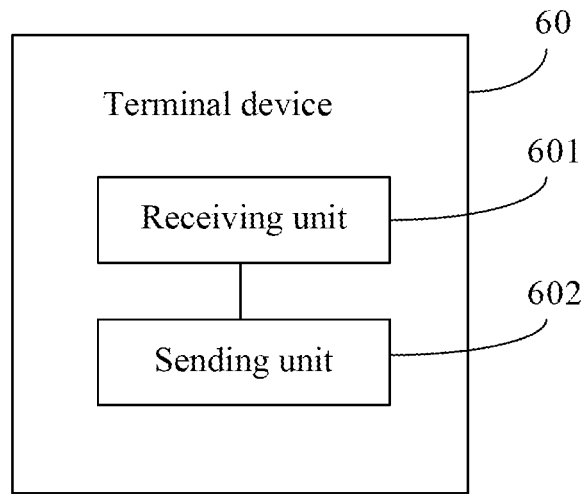
FIG. 7 is a schematic structural diagram of a terminal device provided in an embodiment of the present invention.

An embodiment of the present invention provides a terminal device 60. As shown in FIG. 7, the device includes a receiving unit 601 configured to receive, in a first period, a group messaging task of sending a message to N recipients, where N is greater than or equal to 2, and N is a quantity of group-sent messages. A sending unit 602 is configured to perform group messaging according to a group-send policy sent by a group-send management device, where the group-send policy is generated by the group-send management device according to an information parameter of an information scheduling device. The group-send policy includes: a sending interval, a quantity range, and a validity period of the policy, where a sending interval and a quantity range of each period in the validity period of the policy are in a one-to-one correspondence. The sending unit 602 is specifically configured to acquire, from the group-send policy, a specific quantity range in which the quantity N of group-sent messages is located in the first period; acquire a specific sending interval corresponding to the specific quantity range; and perform group messaging according to the specific sending interval.

In this way, a group-send management device is added to a group messaging system, so that a first sending unit of a terminal device may perform group messaging according to a group-send policy that is generated by the group-send management device and received by a first receiving unit. The group-send policy is generated according to an information parameter of an information scheduling device, and group messaging of the terminal device may change correspondingly when the information parameter of the information scheduling device changes. Therefore, group messaging becomes more flexible, thereby increasing a group-send success rate.

Figure 8:
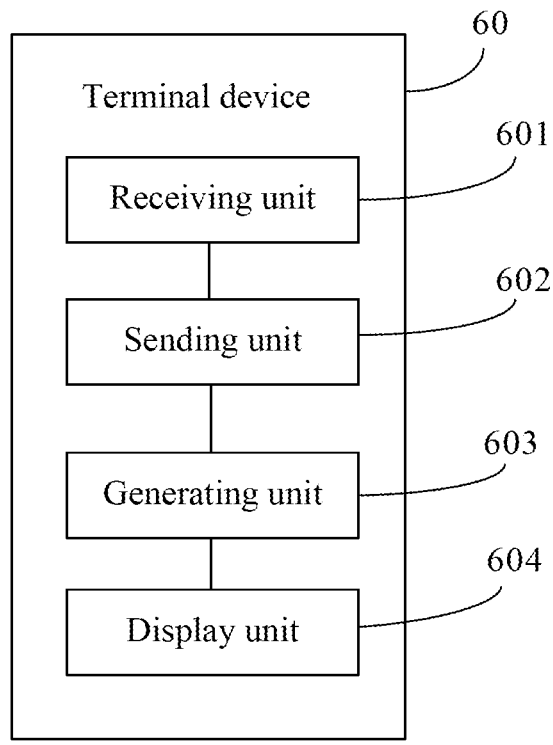
FIG. 8 is a schematic structural diagram of another terminal device provided in an embodiment of the present invention.

Further, as shown in FIG. 8, the terminal device 60 further includes a generating unit 603 configured to generate group-send execution data after the sending unit 602 performs group messaging according to the group-send policy sent by the group-send management device, where the group-send execution data includes a message-sending period, a region identifier of a sending party, and a sending success rate, or the group-send execution data includes a message-sending period, a region identifier of a sending party, a region identifier of a receiving party, and a sending success rate. The sending unit 602 is further configured to send the group-send execution data to the group-send management device, so that the group-send management device adjusts the group-send policy according to the group-send execution data. A display unit 604 is configured to display group-send state information on a display interface when the sending unit 602 performs group messaging according to the group-send policy sent by the group-send management device, or display group-send result information on a display interface after the sending unit performs group messaging according to the group-send policy sent by the group-send management device. The group-send state information includes: a total quantity of recipients, a quantity of messages sent, and/or a recipient of a message that is being sent, and the group-send result information includes: a total quantity of recipients, a quantity of messages successfully sent, and/or a quantity of messages unsuccessfully sent.

The terminal device provided in this embodiment of the present invention may perform group messaging according to a group-send policy generated by a group-send management device. The group-send policy is generated according to an information parameter of an information scheduling device, and group messaging of the terminal device may change correspondingly when the information parameter of the information scheduling device changes. Therefore, group messaging becomes more flexible, thereby increasing a group-send success rate.

An embodiment of the present invention provides a group messaging system, including the group-send management device according to any embodiment of the present invention, configured to acquire an information parameter of an information scheduling device, generate a group-send policy according to the information parameter, and send the group-send policy to a terminal device served by the information scheduling device, so that the terminal device performs group messaging according to the group-send policy; and the terminal device according to any embodiment of the present invention, configured to receive the group-send policy sent by the group-send management device, where the group-send policy is generated by the group-send management device according to the information parameter of the information scheduling device, and perform group messaging according to the group-send policy. The group-send management device may be the group-send management device 50 shown in FIG. 5 or FIG. 6, and the terminal device may be the terminal device 60 shown in FIG. 7 or FIG. 8.

It may be clearly understood by a person skilled in the art that, for the purpose of convenient and brief description, for a specific working process of the foregoing system, devices, and units, reference may be made to a corresponding process in the foregoing method embodiments, and details are not described herein again.

In the group messaging system provided in this embodiment of the present invention, a group-send management device is added to the group messaging system, so that a terminal device may perform group messaging according to a group-send policy generated by the group-send management device. The group-send policy is generated according to an information parameter of an information scheduling device, and group messaging of the terminal device may change correspondingly when the information parameter of the information scheduling device changes. Therefore, group messaging becomes more flexible, thereby increasing a group-send success rate.

Figure 9:
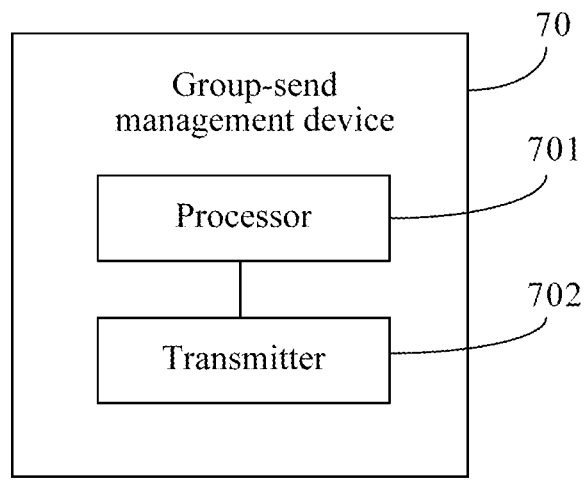
FIG. 9 is a schematic structural diagram of still another group-send management device provided in an embodiment of the present invention; s

An embodiment of the present invention provides a group-send management device 70. As shown in FIG. 9, the device includes a processor 701 configured to acquire an information parameter of an information scheduling device. The processor 701 is further configured to generate a group-send policy according to the information parameter. The information parameter includes: an average message-sending time, a message cache threshold, and busy/idle period distribution; and the group-send policy includes: a sending interval, a quantity range, and a validity period of the policy. A transmitter 702 is configured to send the group-send policy to a terminal device served by the information scheduling device, so that the terminal device performs group messaging according to the group-send policy.

In this way, a group-send management device is added to a group messaging system, so that a terminal device may perform group messaging according to a group-send policy that is sent by a transmitter and generated by the group-send management device. The group-send policy is generated by a processor according to an information parameter of an information scheduling device, and group messaging of the terminal device may change correspondingly when the information parameter of the information scheduling device changes. Therefore, group messaging becomes more flexible, thereby increasing a group-send success rate.

Further, when generating the group-send policy according to the information parameter, the processor 701 is specifically configured to generate the validity period of the policy according to the busy/idle period distribution, and generate a quantity range and a corresponding sending interval of each period in the validity period of the policy according to the average message-sending time, the message cache threshold, and the validity period of the policy, where the sending interval and the quantity range of each period in the validity period of the policy are in a one-to-one correspondence. The sending interval of each period includes at least one first sending interval and at least one second sending interval, where the first sending interval is less than or equal to the average message-sending time, a minimum value of a first quantity range corresponding to the first sending interval is greater than or equal to the message cache threshold, the second sending interval is greater than the average message-sending time, and a maximum value of a second quantity range corresponding to the second sending interval is less than the message cache threshold.

Figure 10:
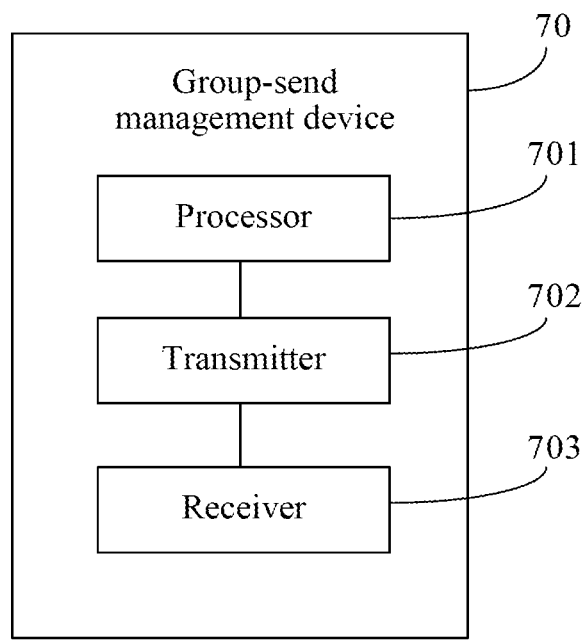
FIG. 10 is a schematic structural diagram of yet another group-send management device provided in an embodiment of the present invention.

Particularly, as shown in FIG. 10, the group-send management device 70 further includes a receiver 703, configured to receive, after the transmitter 702 sends the group-send policy to the terminal device served by the information scheduling device, group-send execution data sent by each terminal device, where the group-send execution data includes a message-sending period, a region identifier of a sending party, and a sending success rate of a terminal, or the group-send execution data includes a message-sending period, a region identifier of a sending party, a region identifier of a receiving party, and a sending success rate of a terminal. The processor 701 is further configured to process the message-sending period, the region identifier of a sending party, and the sending success rate of a terminal that are received by the receiver 703, to obtain a sending success rate of each group-send area in each message-sending period, or process the message-sending period, the region identifier of a sending party, the region identifier of a receiving party, and the sending success rate of a terminal that are received by the receiver, to obtain a receiving success rate of each group-send area in each message-sending period, where at least one information scheduling device is disposed in each group-send area. The processor 701 is further configured to determine whether there is a group-send area, in each group-send area in each message-sending period, whose sending success rate is less than a first preset reference value. When a sending success rate of a first group-send area in a first message-sending period is less than the first preset reference value, or a receiving success rate of a first group-send area in a first message-sending period is less than the second preset reference value, the processor 701 is further configured to adjust a group-send policy, for a relevant period of the first message-sending period, of a terminal device served by an information scheduling device in the first group-send area.

Particularly, when adjusting the group-send policy, for the relevant period of the first message-sending period, of the terminal device served by the information scheduling device in the first group-send area, the processor 701 is specifically configured to shorten a quantity range of the first message-sending period, to obtain a quantity range of the relevant period of the first message-sending period, and/or, extend a sending interval of the first message-sending period, to obtain a sending interval of the relevant period of the first message-sending period.

In this embodiment of the present invention, a group-send management device is added to a group messaging system, so that a terminal device may perform group messaging according to a group-send policy generated by the group-send management device. The group-send policy is generated according to an information parameter of an information scheduling device, and group messaging of the terminal device may change correspondingly when the information parameter of the information scheduling device changes. Therefore, group messaging becomes more flexible, thereby increasing a sending success rate.

Figure 11:
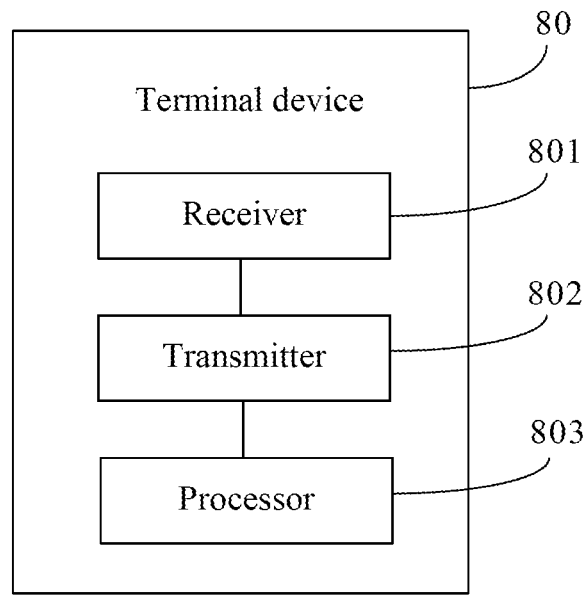
FIG. 11 is a schematic structural diagram of still another terminal device provided in an embodiment of the present invention.

An embodiment of the present invention provides a terminal device 80. As shown in FIG. 11, the device includes a receiver 801 configured to receive, in a first period, a group messaging task of sending a message to N recipients, where N is greater than or equal to 2, and N is a quantity of group-sent messages. A transmitter 802 is configured to perform group messaging and a processor 803, configured to instruct, according to a group-send policy sent by a group-send management device, the transmitter to perform group messaging, where the group-send policy is generated by the group-send management device according to an information parameter of an information scheduling device.

The group-send policy includes: a sending interval, a quantity range, and a validity period of the policy, where a sending interval and a quantity range of each period in the validity period of the policy are in a one-to-one correspondence; and the processor 803 is specifically configured to: acquire, from the group-send policy, a specific quantity range in which the quantity N of group-sent messages is located in the first period; acquire a specific sending interval corresponding to the specific quantity range; and instruct the transmitter 802 to perform group messaging according to the specific sending interval.

In this way, a group-send management device is added to a group messaging system, so that a processor of a terminal device may instruct a transmitter to perform group messaging according to a group-send policy that is generated by the group-send management device and received by a receiver. The group-send policy is generated according to an information parameter of an information scheduling device, and group messaging of the terminal device may change correspondingly when the information parameter of the information scheduling device changes. Therefore, group messaging becomes more flexible, thereby increasing a sending success rate.

The processor 803 is further configured to generate group-send execution data after the transmitter 802 performs group messaging, where the group-send execution data includes a message-sending period, a region identifier of a sending party, and a sending success rate, or the group-send execution data includes a message-sending period, a region identifier of a sending party, a region identifier of a receiving party, and a sending success rate; and send the group-send execution data to the group-send management device by using the transmitter 802, so that the group-send management device adjusts the group-send policy according to the group-send execution data.

Figure 12:
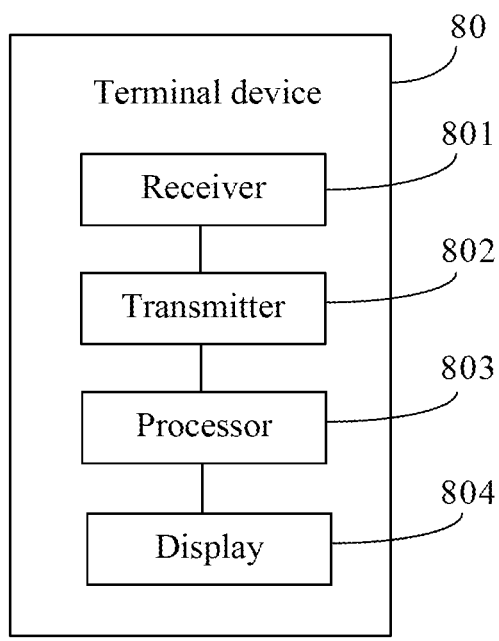
FIG. 12 is a schematic structural diagram of yet another terminal device provided in an embodiment of the present invention.

As shown in FIG. 12, the terminal device 80 further includes a display 804, configured to display group-send state information on a display interface when the transmitter 802 performs group messaging according to a group-send policy sent by a group-send management device, or display group-send result information on a display interface after the transmitter performs group messaging according to a group-send policy sent by a group-send management device, where the group-send state information includes: a total quantity of recipients, a quantity of messages sent, and/or a recipient of a message that is being sent, and the group-send result information includes: a total quantity of recipients, a quantity of messages successfully sent, and/or a quantity of messages unsuccessfully sent.

A processor of the terminal device provided in this embodiment of the present invention may instruct a transmitter to perform group messaging according to a group-send policy generated by a group-send management device. The group-send policy is generated according to an information parameter of an information scheduling device, and group messaging of the terminal device may change correspondingly when the information parameter of the information scheduling device changes. Therefore, group messaging becomes more flexible, thereby increasing a sending success rate.

An embodiment of the present invention provides a group messaging system, including: the group-send management device according to any embodiment of the present invention, configured to acquire an information parameter of an information scheduling device, generate a group-send policy according to the information parameter, and send the group-send policy to a terminal device served by the information scheduling device, so that the terminal device performs group messaging according to the group-send policy; and the terminal device according to any embodiment of the present invention, configured to receive the group-send policy sent by the group-send management device, where the group-send policy is generated by the group-send management device according to the information parameter of the information scheduling device, and perform group messaging according to the group-send policy. The group-send management device may be the group-send management device 70 shown in FIG. 9 or FIG. 10, and the terminal device may be the terminal device 80 shown in FIG. 11 or FIG. 12.

It may be clearly understood by a person skilled in the art that, for the purpose of convenient and brief description, for a specific working process of the foregoing system, devices, and units, reference may be made to a corresponding process in the foregoing method embodiments, and details are not described herein again.

In the group messaging system provided in this embodiment of the present invention, a group-send management device is added to the group messaging system, so that a terminal device may perform group messaging according to a group-send policy generated by the group-send management device. The group-send policy is generated according to an information parameter of an information scheduling device, and group messaging of the terminal device may change correspondingly when the information parameter of the information scheduling device changes. Therefore, group messaging becomes more flexible, thereby increasing a sending success rate.

In the embodiments of the present invention, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A group messaging method comprising:
    acquiring an information parameter of a communications device, wherein the information parameter comprises an average message-sending time, a message cache threshold, and a busy/idle period distribution;
    generating a group-send policy according to the information parameter, wherein the group-send policy comprises a sending interval, a quantity range, and a validity period of the group-send policy, wherein generating the group-send policy according to the information parameter comprises generating the validity period of the group-send policy according to the busy/idle period distribution and generating a quantity range and a corresponding sending interval of each period in the validity period of the group-send policy according to the average message-sending time, the message cache threshold, and the validity period of the group-send policy, and wherein the quantity range and the corresponding sending interval of each period in the validity period of the group-send policy are in a one-to-one correspondence; and
    sending the group-send policy to a terminal device served by the communications device, wherein the group-send policy is configured to be used by terminal device to perform group messaging.

2. The group messaging method according to claim 1, wherein the corresponding sending interval of each period comprises a first sending interval and a second sending interval,
    wherein the first sending interval is less than or equal to the average message-sending time, and a minimum value of a first quantity range corresponding to the first sending interval is greater than or equal to the message cache threshold, and
    wherein the second sending interval is greater than the average message-sending time, and a maximum value of a second quantity range corresponding to the second sending interval is less than the message cache threshold.

3. The group messaging method according to claim 1, wherein after sending the group-send policy to the terminal device served by the communications device, the method further comprises:
- receiving group-send execution data sent by each terminal device out of a plurality of terminal devices, wherein the group-send execution data comprises a message-sending period, a region identifier of a sending party, and a sending success rate of a terminal of each of the terminal device;
- processing the message-sending period, the region identifier of a sending party, and the sending success rate of a terminal that are sent by each terminal device, to obtain a sending success rate of each group-send area in each message-sending period, wherein a serving device is disposed in each group-send area;
- determining whether there is a group-send area, in each group-send area in each message-sending period, whose sending success rate is less than a first preset reference value; and
- when a sending success rate of a first group-send area in a first message-sending period is less than the first preset reference value, adjusting a group-send policy, for a relevant period of the first message-sending period, of a terminal device served by a serving device in the first group-send area.

4. The group messaging method according to claim 3, wherein adjusting the group-send policy comprises:
- shortening a quantity range of the first message-sending period, to obtain a quantity range of the relevant period of the first message-sending period; or
- extending a sending interval of the first message-sending period, to obtain a sending interval of the relevant period of the first message-sending period.

5. The group messaging method according to claim 1, wherein after sending the group-send policy to the terminal device served by the communications device, the method further comprises:
- receiving group-send execution data sent by each terminal device, wherein the group-send execution data comprises a message-sending period, a region identifier of a sending party, a region identifier of a receiving party, and a sending success rate of a terminal;
- processing the message-sending period, the region identifier of a sending party, the region identifier of a receiving party, and the sending success rate of a terminal that are sent by each terminal device, to obtain a receiving success rate of each group-send area in each message-sending period, wherein a serving device is disposed in each group-send area;
- determining whether there is a group-send area, in each group-send area in each message-sending period, whose receiving success rate is less than a second preset reference value; and
- when a receiving success rate of a first group-send area in a first message-sending period is less than the second preset reference value, adjusting a group-send policy, for a relevant period of the first message-sending period, of a terminal device served by a serving device in the first group-send area.

6. The group messaging method according to claim 5, wherein adjusting the group-send policy comprises:
- shortening a quantity range of the first message-sending period, to obtain a quantity range of the relevant period of the first message-sending period; or
- extending a sending interval of the first message-sending period, to obtain a sending interval of the relevant period of the first message-sending period.

7. A group messaging method comprising:
- receiving, in a first period, a group messaging task of sending a message to N recipients, wherein N is greater than or equal to 2, and N is equal to a quantity of group-sent messages; and
- performing group messaging according to a group-send policy sent by a group-send management device, wherein the group-send policy is generated by the group-send management device according to an information parameter of a communications device, wherein performing the group messaging according to the group-send policy sent by the group-send management device comprises displaying group-send state information on a display interface, wherein the group-send state information comprises a total quantity of recipients, a quantity of messages sent, a recipient of a message that is being sent, or a combination thereof.

8. The group messaging method according to claim 7, wherein the group-send policy comprises: a sending interval, a quantity range, and a validity period of the group-send policy,
wherein a sending interval and a quantity range of each period in the validity period of the group-send policy are in a one-to-one correspondence, and
wherein performing the group messaging according to the group-send policy sent by the group-send management device comprises:
- acquiring, from the group-send policy, a specific quantity range in which the N quantity of group-sent messages is located in the first period,
- acquiring a specific sending interval corresponding to the specific quantity range, and
- performing the group messaging according to the specific sending interval.

9. The group messaging method according to claim 7, wherein after performing the group messaging according to the group-send policy sent by the group-send management device, the method further comprises:
- generating group-send execution data, wherein the group-send execution data comprises a message-sending period, a region identifier of a sending party, and a sending success rate, or wherein the group-send execution data comprises a message-sending period, a region identifier of a sending party, a region identifier of a receiving party, and a sending success rate; and
- sending the group-send execution data to the group-send management device, wherein the group-send management device adjusts the group-send policy according to the group-send execution data.

10. The group messaging method according to claim 7, wherein after performing the group messaging according to the group-send policy sent by the group-send management device, the method further comprises:
- displaying group-send result information on a display interface, wherein the group-send result information comprises: a total quantity of recipients, a quantity of messages successfully sent, and/or a quantity of messages unsuccessfully sent.

11. A group-send management device comprising:
- a processor configured to acquire an information parameter of a communications device, and to generate a group-send policy according to the information parameter, wherein the information parameter comprises an average message-sending time, a message cache threshold, and a busy/idle period distribution, wherein the group-send policy comprises a sending interval, a quantity range, and a validity period of the group-send policy, wherein the processor generates the group-send policy according to the information parameter by generating the validity period of the group-send policy according to the busy/idle period distribution, and generating a quantity range and a corresponding sending interval of each period in the validity period of the group-send policy according to the average message-sending time, the message cache threshold, and the validity period of the group-send policy, and wherein the quantity range and the corresponding sending interval of each period in the validity period of the group-send policy are in a one-to-one correspondence; and a transmitter configured to send the group-send policy to a terminal device served by the communications device, wherein the group-send policy is configured to be used by a terminal device to perform group messaging.

12. The group-send management device according to claim 11, wherein the corresponding sending interval of each period comprises a first sending interval and a second sending interval;

wherein the first sending interval is less than or equal to the average message-sending time, and a minimum value of a first quantity range corresponding to the first sending interval is greater than or equal to the message cache threshold; and wherein the second sending interval is greater than the average message-sending time, and a maximum value of a second quantity range corresponding to the second sending interval is less than the message cache threshold.

13. The group-send management device according to claim 11, wherein the group-send management device further comprises:

a receiver configured to receive, after the transmitter sends the group-send policy to the terminal device served by the communications device, group-send execution data sent by each terminal device out of a plurality of terminal devices, wherein the group-send execution data comprises a message-sending period, a region identifier of a sending party, and a sending success rate of a terminal of each of the terminal device, or wherein the group-send execution data comprises a message-sending period, a region identifier of a sending party, a region identifier of a receiving party, and a sending success rate of a terminal; and wherein the processor is further configured to:

process the message-sending period, the region identifier of a sending party, and the sending success rate of a terminal that are received by the receiver, to obtain a sending success rate of each group-send area in each message-sending period, or process the message-sending period, the region identifier of a sending party, the region identifier of a receiving party, and the sending success rate of a terminal that are received by the receiver, to obtain a receiving success rate of each group-send area in each message-sending period, and wherein a serving device is disposed in each group-send area;

determine whether there is a group-send area, in each of the group-send area in each of the message-sending period, whose sending success rate is less than a first preset reference value; or determine whether there is a group-send area, in each group-send area in each message-sending period, whose receiving success rate is less than a second preset reference value; and when a sending success rate of a first group-send area in a first message-sending period is less than the first preset reference value, or a receiving success rate of a first group-send area in a first message-sending period is less than the second preset reference value, adjust a group-send policy, for a relevant period of the first message-sending period, of a terminal device served by a serving device in the first group-send area.

14. The group-send management device according to claim 13, when adjusting the group-send policy, the processor is specifically configured to:

shorten a quantity range of the first message-sending period, to obtain a quantity range of the relevant period of the first message-sending period; or, extend a sending interval of the first message-sending period, to obtain a sending interval of the relevant period of the first message-sending period.

* * * * *